United States Patent [19]

Baker

[11] 3,904,605

[45] Sept. 9, 1975

[54] PENICILLIN OXIDATION PROCESS

[75] Inventor: Patrick J. Baker, Indianapolis, Ind.

[73] Assignee: Eli Lilly and Company, Indianapolis, Ind.

[22] Filed: Sept. 12, 1972

[21] Appl. No.: 288,459

[52] U.S. Cl. ............... 260/239.1; 424/271; 260/687
[51] Int. Cl.$^2$ ...................................... C07D 499/04
[58] Field of Search ................................. 260/239.1

[56] References Cited
UNITED STATES PATENTS

| | | | |
|---|---|---|---|
| 3,025,290 | 3/1962 | Doyle et al. | 260/239.1 |
| 3,047,467 | 7/1962 | Doyle et al. | 260/239.1 |
| 3,197,466 | 7/1965 | Chow et al. | 260/239.1 |
| 3,586,667 | 6/1971 | Hatfield | 260/239.1 |
| 3,647,787 | 3/1972 | Cooper | 260/239.1 |

OTHER PUBLICATIONS

Chow et al., J. Organic Chem., 27, p. 1381, 1962.
Guddal et al., Tetrahedron Letters, No. 9, p. 381, 1962.
Essery et al., J. Organic Chem., 30, p. 4388, 1965.

*Primary Examiner*—Nicholas S. Rizzo
*Assistant Examiner*—Mary C. Vaughn
*Attorney, Agent, or Firm*—William B. Scanlon; Everet F. Smith

[57] ABSTRACT

Penicillin sulfoxide acid is obtained in higher, more economical yield and of surprisingly good purity from penicillin in fermentation filtered broth by concentrating the broth, diluting the concentrated broth with miscible organic liquid, optionally separating insolubles, treating the liquid mixture with a per-acid oxidizing agent to form sulfoxide, adjusting the ph of the mixture to 1.5 to 2.5, and crystallizing the penicillin sulfoxide acid, with the aid of additional water, if necessary, and separating the solid penicillin sulfoxide.

9 Claims, No Drawings

PENICILLIN OXIDATION PROCESS

BACKGROUND OF THE INVENTION a. Penicillin Sulfoxides

Sykes and Todd disclosed penicillin sulfoxides in their *Interim Report From the Chemical Laboratory*, Cambridge University, C.P.S. 526, O.S.R.D. Liason Reference N. WA-4552.34 by P. Sykes and A. R. Todd, June 12, 1945 "Oxidation Studies on Thiazolidines; the preparation of Methyl Penicillin-II-sulfoxide". This war-time report is cited in the penicillin monograph entitled *The Chemistry of Penicillin*, edited by Hans T. Clarke et al., Princeton University Press, 1949. On page 157 of the penicillin monograph the structure of benzyl penicillin sulfoxide (XLIX) is given. On page 946 of the penicillin monograph there is reported a method for oxidizing thiazolidines (of which class penicillins are members) in water or aqueous ethanol with standardized sodium meta periodate. In addition, Chow et al., U.S. Pat. No. 3,197,466, discloses phenoxymethyl penicillin sulfoxide and benzyl penicillin sulfoxide.

Penicillin sulfoxides have become of some commercial interest in more recent years as intermediates in processes for converting penicillins to cephalosporin antibiotics. In such a process, e.g., a penicillin sulfoxide can be converted to a penicillin sulfoxide ester. Conversion of penicillin sulfoxide esters to 3-methyl cephalosporin esters is taught and claimed in Morin/Jackson U.S. Pat. No. 3,275,626. Improvements on the pioneer Morin/Jackson process have been made by Cooper (U.S. Pat. No. 3,647,787), Hatfield (U.S. Pat. Nos. 3,586,667 and 3,591,585). These patents also disclose that penicillins are converted to penicillin sulfoxides for use in this overall process. Such a process is used commercially for the production of at least one commercially significant cephalosporin antibiotic, e.g., cephalexin.

Presently commercial methods for preparing penicillin sulfoxides have first entailed the extraction of the penicillin from the fermentation broth into an organic solvent such as amyl acetate at a pH around 2, separating the organic and aqueous phases, treating the organic phase with a concentrated alkali metal salt solution, e.g., potassium or sodium acetate, in excess molar amount, to crystallize the alkali metal penicillin salt therefrom. After washing and drying, the penicillin salt crystals are redissolved in aqueous acetone or other aqueous organic solvent mixture and then treated with per-acid oxidizing agent such as per-acetic acid at 0° to 15°C. Thereafter, the penicillin sulfoxide solution is warmed to room temperature, acidified with acid such as 70 percent methanesulfonic acid to initiate crystallization and chilled to about 5°C. and diluted with water to complete the crystallization. The crystallized penicillin sulfoxide is filtered, washed with water and dried before use.

b. Penicillin Broth Treatments

U.S. Pat. No. 3,014,845 and 3,014,846 disclose the enzymatic cleavage of penicillin to 6-aminopenicillanic acid (6-APA) in a fermentation broth. In U.S. Pat. No. 3,025,290, Doyle suggests in column 3, lines 20 to 23 the use of filtered broth for reactions to make new penicillins from 6-APA contained therein. Similar suggestions are made in U.S. Pat. No. 3,043,831, column 4, lines 34 to 37 and U.S. Pat. No. 3,047,467, column 1, lines 47 to 52. However, none of these patents suggest the formation of penicillin sulfoxides or the use of penicillin broths directly in processes for making penicillin sulfoxides.

The prior processes for making penicillin sulfoxides always started from substantially pure penicillins or are not as efficient in penicillin sulfoxide yield recovery as is desired for a manufacturing process.

It is an object of this invention to provide an improved process for preparing penicillin sulfoxides from cruder sources of penicillin.

It is another object of this invention to provide a simpler process for preparing penicillin sulfoxides from penicillin containing aqueous liquors.

Other objects, aspects, and advantages of the process of this invention will become apparent from reading the remaining specification and claims which follow.

SUMMARY OF THE INVENTION

Briefly, this invention provides a process for preparing penicillin sulfoxides from penicillin containing filtered fermentation broth. In this process, the filtered broth is concentrated to an efficient penicillin concentration, diluted with a miscible organic diluent, polished (filtered), if desired, to remove insolubles, the filtrate is chilled and treated with an oxidizing agent to convert the penicillin to penicillin sulfoxide, the oxidized mixture is treated with acid to lower the pH of the mixture low enough to enhance the crystallization of the penicillin sulfoxide, generally to from pH 1.5 to 2.5, diluting the acidified mixture with an aqueous medium to optimize penicillin sulfoxide crystallization, and precipitation and separating the solid penicillin sulfoxide acid from the liquid medium.

By this process, the former step of penicillin crystalline salt formation, prior to sulfoxide formation, is removed and the necessity for organic solvent extraction of the penicillin fermentation filtered broth is obviated. In addition, the yields of penicillin sulfoxide from a given amount of penicillin fermentation liquor are significantly improved and its purity is unexpectedly good.

DETAILED DESCRIPTION OF THE INVENTION

This invention provides The process for preparing solid penicillin sulfoxide acid or salts thereof directly from penicillin containing filtered fermentation broth. This process can be described, for example, as a combination of a series of steps, although we do not intend that our claimed process necessarily include all of these steps in the order given. the various steps are recited as a convenient means for describing the best mode of the process contemplated by me at the present time. This process comprises:

a. concentrating the penicillin containing fermentation broth, from which the penicillin mycelia has been separated, to an efficient liquid volume, which we estimate to be to a concentration of 200 to 400 milligrams of solid per milliliter of liquid volume, b. diluting the concentrated liquid from step (a) with from about one-half to about 3 volumes, preferably from about 0.5 to 2 volumes, of miscible organic liquid, e.g. acetone, per volume of concentrated broth, c. precipitating and separating, if desired, the insolubles in the diluted mixture from step (b), $d_1$. if desired, the organic liquid e.g., acetone, can be separated from the filtrate from step (c), although this step is not necessary, d₂. treating the liquid (filtrate) from step (c) or the aqueous solution residue from step (d₁) with an oxidizing agent which is capable of oxidizing a penicillin to a penicillin sulfoxide, and which is at least partially soluble in the liquid mixture in an amount sufficient to effect oxidation of the penicillin contained therein at a temperature of from about −20°C. to about 25°C., e. treating the oxidized mixture from step (d) with an acid to lower the pH of the mixture low enough to enhance crystallization of the penicillin sulfoxide, which for the most commonly used penicillins is in the pH range of from about 1.5 to about 2.5, f. diluting the acid treated mixture from step (e) with sufficient water or other aqueous medium to optimize crystallization of the penicillin sulfoxide acid from the liquid phase; and g. separating the solid penicillin sulfoxide from the mixture of step (f).

The penicillin containing filtered fermentation broth can be used in the process without the concentration to obtain low yields and/or low qualities of penicillin sulfoxide product. We prefer to concentrate the fermentation broth prior to dilution thereof with the organic diluent. Conventional evaporation equipment imposing reduced pressures on the liquid can be used for this purpose.

In step (b) the filtered fermentation broth, preferably concentrated, is diluted with from one-half to 3 volumes of any miscible organic liquid which will help separate undesired impurities as a precipitate in the mixture. If the solids are substantial in amount, the mixture is filtered or centrifuged to separate the solids from the aqueous/organic filtrate containing the penicillin values therein. If the solids are minor in amount and can be carried through the process without impairing the yield or quality of the penicillin sulfoxide product, the separation may not be necessary. However, we prefer to separate such insolubles to obtain a more pure product. Various miscible and partially miscible organic liquids can be used to dilute the concentrated filtered broth. Acetone is preferred although other organic liquids such as methyl ethyl ketone, methanol, ethanol, isopropanol, tert-butanol, acetonitrile, propionitrile and the like can be used, although not necessarily with equivalent improved yields of penicillin sulfoxide. After any insoluble impurities are removed from the aqueous/organic mixture, the organic phase can be removed, by evaporation, if desired to leave an aqueous penicillin solution, although we prefer to carry the organic diluent component through the process.

The aqueous or aqueous/organic penicillin solution obtained as described above is then treated with an oxidizing agent which will form a penicillin sulfoxide. Examples of oxidizing agents for this purpose include per-acetic acid, per-propionic acid, per-benzoic acid, per-succinic acid, and the oxidizing agents cited in the above referenced patents. We prefer to use per-acetic (42% or less by weight, as commercially available) or per-succinic acid. An excess molar amount of the oxidizing agent, relative to the penicillin content in the solution, is used to insure optimum penicillin sulfoxide formation. Generally, from 1 to 3 moles of oxidizing agent per mole of penicillin will be sufficient but amounts greater than that can be used if desired. The oxidation is conducted while the penicillin is preferably chilled or cooled to −15°C. to +5°C. for most efficient reaction and use of materials.

When the oxidation is essentially completed the reaction mixture is treated with an acid to lower the pH to a point where crystallization of the penicillin sulfoxide is favored. For the most commonly used penicillins, e.g., phenoxymethyl penicillin and benzyl penicillin, the pH range will be between about 1.5 and 2.5. Other penicillin sulfoxides may crystallize best at pH ranges varying somewhat from this range, but this is considered to be the best pH range for most penicillin sulfoxide crystallizations. Examples of acids which may be used include methanesulfonic, p-toluenesulfonic, hydrochloric, sulfuric, ortho-phosphoric, nitric acids, with methanesulfonic acid being preferred.

To enhance crystallization of the solid penicillin sulfoxide and separation thereof from the liquid medium, we prefer to add additional water to optimize the separation of penicillin sulfoxide crystal product. The water may be added, prior to, simultaneously with, or in addition to and subsequent to the addition of acid referred to above.

When the penicillin sulfoxide product precipitation is essentially complete the mixture can be treated to separate the penicillin sulfoxide crystal product from the liquid mother liquors. Filtration or centrifugation procedures exemplify such separation.

By this procedure, we have unexpectedly found that the processing of penicillin in fermentation liquors to penicillin sulfoxide product can be simplified and made more economical. Such simplification and economy is exemplified by the doing away with the need for organic solvent extraction of the filtered fermentation liquors to extract the penicillin values therein, and in the unexpected increase in yield of penicillin sulfoxide of unexpectedly good purity from a given quantity of penicillin in filtered fermentation broth.

The invention is further illustrated by the following detailed examples, which are intended as illustrations of variables in the process of the invention and not as limitations thereof.

EXAMPLE 1

This example compares the improved process of this invention with a conventional process for making phenoxymethyl penicillin sulfoxide acid. This detailed example illustrates a definite improvement in terms of yield of the penicillin sulfoxide acid from a given quantity of penicillin filtered broth.

A. Conventional Process

A portion of filtered broth containing 24.15 g. of phenoxymethyl penicillin was extracted with 1/3 volume of amyl acetate at pH 2.0. The aqueous and organic phases were separated. To the amyl acetate phase there was added concentrated potassium acetate solution to three times the molar concentration of the penicillin. The resulting crystallized potassium phenoxymethyl penicillin salt was filtered, washed with isopropyl alcohol, and dried at 40°C. in a vacuum oven. These potassium phenoxymethyl penicillin salt crystals contained 16.2 g. of penicillin activity for a yield of 67.2 percent from the filtered broth.

A portion of these potassium phenoxymethyl penicillin salt crystalline materials containing 15.75 g. of phenoxymethyl penicillin acid (representing 23.4 g. of broth penicillin) was dissolved in 50 ml. of water. 40 ml. of acetone was added. The mixture was cooled to 0°C. and oxidized with excess 40 percent per-acetic acid at that temperature.

Twenty minutes after the oxidation, the solution was warmed to 25° and the pH of the mixture was lowered to 2.0 with 70 percent methanesulfonic acid to initiate crystallization. Twenty-five ml. of water was added and the mixture was chilled to about 5°C. to complete the crystallization. The crystallized mixture was filtered and the product was washed with 2 cake-volumes of water before drying for 4 hours at 58°C. in a vacuum oven.

The phenoxymethyl penicillin sulfoxide acid product weighed 15.5 g. The purity was 96.8 percent; corrected for water, 99.4 percent. The yield from potassium phenoxymethyl penicillin salt crystals to sulfoxide was 91.0 percent, which gives an overall yield from filtered broth of 61.2 percent.

B. Concentrated Filter Broth Process

A portion of filtered broth (containing 24.15 g. of phenoxymethyl penicillin) was concentrated under vacuum to about 260 mg./ml. of solids concentration at 27°–29°C. during 5 hours. An amount of acetone equal to the volume of the concentrate was added. The resulting precipitate was removed by pressure filtration with the help of a filter aid.

One-third of the filtrate from the above filtration was removed for other operations. The remaining 66 percent of the original volume of the filtrate, representing 15.9 g. of the starting broth phenoxymethyl penicillin activity was oxidized at 0°C. with excess commercial grade 40 percent per-acetic acid. After 20 minutes the mixture was warmed to 25°C., and the pH of the mixture was lowered to 2.0 with 70 percent methanesulfonic acid. A volume of water equivalent to 1.3 times the starting concentrate volume represented by the aliquot used was added and the mixture chilled to about 5°C. to complete the crystallization. The phenoxymethyl penicillin sulfoxide acid crystals were filtered and washed with 2 cake-volumes of water. The product was dried in a vacuum oven for 5.5 hours at 58°C.

The dried phenoxymethyl penicillin sulfoxide acid weighed 14.2 g. The purity was 97.9 percent; corrected for water, 99.7 percent. The yield from filtered broth to final product was 83.5 percent.

EXAMPLE 2

A portion of filtered fermentation broth containing 27 g. of benzyl penicillin acid was concentrated to about 1/9 its volume. This concentrated liquor was treated with 16 ml. of 40 percent per-acetic acid at 0°–10°C. After the oxidation reaction was essentially complete, the mixture was allowed to warm to 25°C. and 4 ml. more of 40 percent per-acetic acid solution was added.

About 0.9 volume of ethyl acetate was added to the mixture described above, the pH of the mixture was lowered to 2.0 with 70 percent methanesulfonic acid. A 100 ml. aliquot of the solvent phase was scrubbed with water and dried to give 10 g. of an amorphous benzyl penicillin solid with a benzyl penicillin purity of 76.6 percent. This is equivalent to a 73.2 percent yield from filtered broth. The identity of the benzyl penicillin sulfoxide acid was confirmed by thin layer chromatography and an infrared curve.

EXAMPLE 3

The procedure of Example 1 was substantially repeated, but using per-succinic acid as the oxidizing agent. Per-succinic acid can be prepared by the procedure described on page 820 of *Reagents for Organic Synthesis*, L. F. Fieser and M. Fieser, published by John Wiley and Sons, Inc. (1967). Even though an insufficient quantity of the per-succinic acid was used in this experiment, a 63.5 percent yield of phenoxymethyl penicillin sulfoxide acid product was obtained, (based on the quantity of filtered broth). The phenoxymethyl penicillin sulfoxide acid product had a purity of 97.8 percent.

EXAMPLES 4 TO 7

The procedure of Example 1 was substantially repeated, except that the effect of the acetone diluent for the concentrated phenoxymethyl penicillin filtered broth was compared with the effects of equivalent volumes of other organic diluents.

The indicated organic diluent, the yield of phenoxymethyl penicillin sulfoxide acid product (based on the penicillin content in the filtered broth), and the purity of the respective products are indicated in the table which follows:

Effect of Various Organic Diluents

| Diluent | Yield from Filtered Broth (Percent of theoretical) | Purity (Percent by wt.) |
|---|---|---|
| Acetone | 87.2 | 99.2 |
| Methanol | 75.7 | 96.4 |
| Isopropanol | 75.7 | 96.1 |
| Acetonitrile | 61.7 | 98.5 |

EXAMPLES 8 TO 11

The procedure of Example 1 was substantially repeated, except that use of methanesulfonic acid was compared with the use of equivalent amounts of other acids in the crystallization step in their effect on the yield of phenoxymethyl penicillin sulfoxide acid product. The results are summarized in the table which follows:

Effect of Various Acids

| Acid | Yield from Filtered Broth (% of theoretical) | Purity % by wt.) |
|---|---|---|
| 70% $CH_3SO_3H$ | 79.2 | 99.4 |
| 30% $H_2SO_4$ | 78.3 | 98 |
| Conc. HCl | 76 | 98.2 |
| 85% $H_3PO_4$ | 76 | 97.2 |

I claim:

1. A process for preparing a 6-acylamidopenicillin sulfoxide which comprises:

a. diluting a penicillin-containing filtered fermentation broth derived from a penicillin fermentation with a miscible organic liquid selected from acetone, methyl ethyl ketone, methanol, ethanol, isopropanol, t-butanol, acetonitrile and propionitrile in an amount sufficient to cause precipitation of non-penicillin insolubles, b. treating the penicillin containing solution from step (a) at a temperature of from about −20° C. to about 25°C. with a per-acid oxidizing agent selected from peracetic acid, perpropionic acid, perbenzoic acid, and persuccinic acid which is soluble in the liquid mixture in an amount sufficient to effect oxidation of the penicillin to penicillin sulfoxide, c. treating the oxidized mixture from step (b) with an acid to lower the pH to 1.5 to 2.5 to induce the penicillin sulfoxide crystallization, d. mixing an aqueous medium with the acidified mixture from step (c) to optimize crystallization of the penicillin sulfoxide, and e. separating penicillin sulfoxide from the liquid mixture in step (d).

2. A process as defined in claim 1 wherein the penicillin containing filtered fermentation broth is concentrated to from about 200 to 400 milligrams of solid per milliliter of liquid volume before diluting such broth.

3. A process as defined in claim 2 wherein the concentrated filtered fermentation broth is diluted with from about 0.5 to about 2 volumes of acetone per volume of broth.

4. A process as defined in claim 3 wherein per-acetic acid is used to oxidize the penicillin to penicillin sulfoxide.

5. A process as defined in claim 4 wherein methanesulfonic acid is added to lower the pH of the oxidized penicillin mixture to from about 1.5 to 2.5.

6. A process as defined in claim 5 wherein phenoxymethyl penicillin sulfoxide is prepared and recovered from a phenoxymethyl penicillin filtered broth.

7. A process as defined in claim 1 wherein benzyl penicillin sulfoxide is prepared and recovered from a benzyl penicillin filtered broth.

8. In a process for preparing phenoxymethyl penicillin sulfoxide acid, the improvement which comprises concentrating a phenoxymethyl penicillin filtered fermentation broth to a concentration of from about 200 to about 400 mg. of penicillin activity per milliliter of liquid volume, diluting the concentrated phenoxymethyl penicillin liquid with from about 0.5 to about 2 volumes of acetone per volume of concentrated phenoxymethyl penicillin broth, precipitating and separating any insolubles in the diluted mixture, treating the filtered, diluted mixture with per-acetic acid solution in an amount sufficient to oxidize phenoxymethyl penicillin at $-20°$ to $25°C$., treating the oxidized mixture with sufficient methanesulfonic acid to lower the pH of the mixture to from about 1.5 to 2.5, diluting the acidified mixture with sufficient water to optimize crystallization of phenoxymethyl penicillin sulfoxide acid from the liquid phase, and separating the phenoxymethyl penicillin sulfoxide acid from the liquid mixture.

9. An improved process as defined in claim 8 wherein benzyl penicillin sulfoxide acid is recovered from a benzyl penicillin filtered broth.

* * * * *